(12) United States Patent
Du

(10) Patent No.: US 9,401,956 B2
(45) Date of Patent: *Jul. 26, 2016

(54) SYSTEMS AND METHODS FOR PERFORMING GROUP ACTIONS BASED ON MACHINE-READABLE CODES

(71) Applicant: Facebook, Inc., Menlo Park, CA (US)

(72) Inventor: Qixing Du, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/934,012

(22) Filed: Nov. 5, 2015

(65) Prior Publication Data

US 2016/0105496 A1    Apr. 14, 2016

Related U.S. Application Data

(63) Continuation of application No. 14/509,959, filed on Oct. 8, 2014.

(51) Int. Cl.
  *G06K 7/10* (2006.01)
  *H04L 29/08* (2006.01)
  *G06F 17/30* (2006.01)

(52) U.S. Cl.
  CPC .............. *H04L 67/104* (2013.01); *G06F 17/30* (2013.01); *G06F 17/30879* (2013.01); *H04L 67/10* (2013.01); *H04L 67/30* (2013.01); *H04L 67/306* (2013.01)

(58) Field of Classification Search
  CPC .......... G06K 7/1443; G06K 19/06037; G06K 17/00; G06K 7/10693; G06K 7/1008; G06Q 20/341; G06Q 30/02
  USPC ........................ 235/462.09, 462.13, 375, 380
  See application file for complete search history.

(56) References Cited

U.S. PATENT DOCUMENTS

2012/0199643 A1 * 8/2012 Minnick ........... G06F 17/30879
                                                                    235/375

* cited by examiner

*Primary Examiner* — Karl D Frech
(74) *Attorney, Agent, or Firm* — Sheppard Mullin Richter & Hampton LLP

(57) ABSTRACT

Systems, methods, and non-transitory computer-readable media can receive from a user a machine-readable code associated with a group. The group can be identified based on the machine-readable code. A set of current members of the group can be identified. The user can be provided with access to the set of current members of the group. In some instances, an identifier for the user can be received. The user can be added, based on the identifier, to the set of current members of the group. The current members can be provided with access to the set of current members including the user.

20 Claims, 12 Drawing Sheets

SYSTEMS AND METHODS FOR PERFORMING GROUP ACTIONS BASED ON MACHINE-READABLE CODES

CROSS-REFERENCE TO RELATED APPLICATIONS

This application is a continuation of U.S. patent application Ser. No. 14/509,959, filed on Oct. 8, 2014 and entitled "Systems and Methods for Performing Group Actions based on Machine-Readable Codes", which is incorporated herein by reference.

FIELD OF THE INVENTION

The present technology relates to the field of machine-readable codes. More particularly, the present technology relates to techniques for performing group actions based on machine-readable codes.

BACKGROUND

Today, people utilize computing devices (or systems) for various purposes. Users can use their computing devices to interact with one another, access content, share content, and create content. A user can utilize his or her computing device to interact with a social networking system (or service), such as by providing, viewing, or otherwise accessing information through the social networking system. In some cases, the social networking system can provide an interface or medium for users of the social networking system to communicate with one another.

In some instances, two or more users of the social networking system may desire to become connected within the social networking system, such as by adding one another as friends. Conventional approaches typically involve one user typing another user's name or identifier into a search bar and searching for the other user within the social networking system. However, such conventional approaches can often times be inconvenient, challenging, and inefficient. For example, typing on a small keyboard can be difficult or cumbersome for the user. In another example, one user can misspell another user's name. In a further example, there can be multiple users with the same name. These and other concerns associated with conventional approaches can create challenges for or reduce the overall user experience associated with interacting among multiple users.

SUMMARY

Various embodiments of the present disclosure can include systems, methods, and non-transitory computer readable media configured to receive from a user a machine-readable code associated with a group. The group can be identified based on the machine-readable code. A set of current members of the group can be identified. The user can be provided with access to the set of current members of the group.

In an embodiment, an identifier for the user can be received. The user can be added, based on the identifier, to the set of current members of the group. The current members can be provided with access to the set of current members including the user.

In an embodiment, the providing the current members with access to the set can correspond to one or more push operations. In some cases, the providing the current members with access to the set can include broadcasting the set to the current members via the one or more push operations.

In an embodiment, the machine-readable code can include at least one of a Quick Response (QR) code, a machine-readable barcode, or a machine-readable tag.

In an embodiment, the group can be managed, at least in part, by a host user. In some instances, the machine-readable code can be provided via the host user. In some cases, the receiving from the user of the machine-readable code can occur subsequent to the user scanning the machine-readable code provided via the host user.

In an embodiment, the user can be provided with one or more actions to be performed with respect to at least a subset of the set of current members of the group.

In an embodiment, the one or more actions can include at least one of accessing a resource, adding social network connections, requesting to add social network connections, removing social network connections, ignoring requests for social networking connections, communicating in a message, interacting with an event, interacting with a group, interacting with a page, interacting with a game, or interacting with a campaign.

In an embodiment, the user can be provided with one or more actions to be performed with respect to an entirety of the set of current members excluding the user.

In an embodiment, the machine-readable code can be presented via a computing device of the user in conjunction, at least temporarily, with at least a subset of the set of current members of the group that is also presented via the computing device of the user.

In an embodiment, the machine-readable code presented via the computing device of the user can be scanned, using a code scanner tool, by at least a second user.

In an embodiment, a second identifier can be received for the second user. The second user can be added, based on the second identifier, to the set of current members of the group. The current members can be provided with access to the set of current members including the second user.

In an embodiment, it can be determined that the user satisfies one or more specified criteria prior to the providing the user with access to the set of current members of the group.

In an embodiment, the one or more specified criteria can be associated with at least one of a time limitation, a location limitation, a privacy limitation, or a limitation relating to a number of times the machine-readable code is scanned.

In an embodiment, the one or more specified criteria can be set by at least one of a system setting or an instruction from a host user.

In an embodiment, the set of current members of the group can be presented to the user via a computing device of the user. In some instances, the set of current members can be sorted based on at least one of time, an alphabetical order, or a social network graph ranking relative to the user.

In an embodiment, the group can be associated with at least one of a social networking system, a forum, a meeting, or an event.

Many other features and embodiments of the invention will be apparent from the accompanying drawings and from the following detailed description.

Figure 1A:
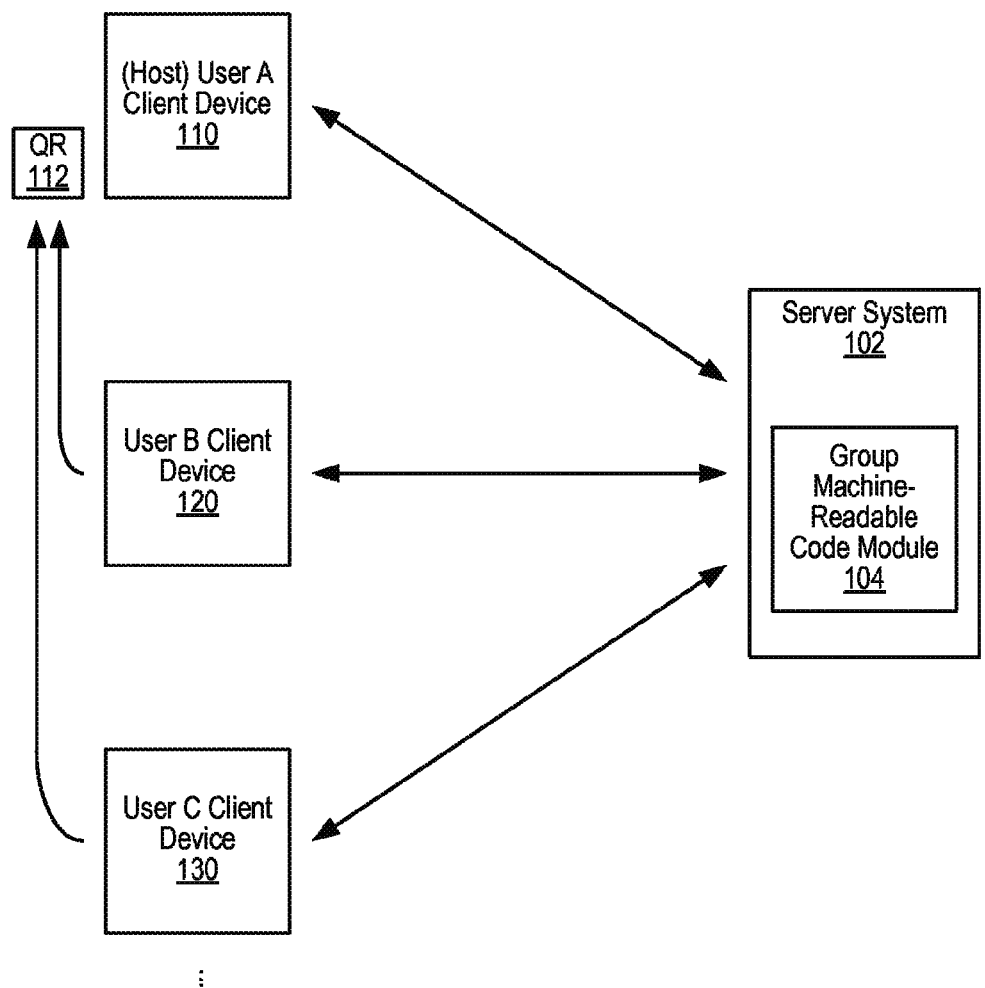
FIG. 1A illustrates an example system in which group actions can be performed based on machine-readable codes, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Performing Group Actions Based on Machine-Readable Codes

People use computing devices (or systems) for a wide variety of purposes. Computing devices can provide different kinds of functionality. Users can utilize their computing devices to produce information, access information, and share information. In some cases, users can use their computing devices to access information through a social networking system (or service). Users can connect with one another via the social networking system. In addition, through the social networking system, multiple users can communally interact, share information, access information, play games, generate funds, or accomplish various other tasks.

In some cases, a first user of the social networking system (or service) and a second user of the social networking system may desire to connect with each other. Under conventional approaches, usually either the first user or the second user has to obtain the other user's name, type the other user's name into a search tool, search for the other user within the social networking system, and find the other user within the search results. However, often times the other user's name can be difficult to spell. Moreover, searching for the other user's name can produce many search results containing irrelevant users with the same name. Furthermore, the act of typing the other user's name can be inconvenient, challenging, and inefficient. Additionally, under conventional approaches, if the first and second users meet a third user and wish to connect with the third user, then the first and third users have to connect with each other in one occasion, and the second and third users have to connect with each other in another occasion. Accordingly, such conventional approaches to interacting among multiple users can be challenging, inconvenient, and inefficient. These and other conventional approaches can add unnecessary obstacles for multiple users to connect or otherwise interact via the social networking system. Conventional approaches can create challenges for or reduce the overall user experience associated with interacting among multiple users.

Therefore, an improved approach to facilitating interactions among multiple users can be beneficial for addressing or alleviating various concerns associated with conventional approaches. Various embodiments of the present disclosure can receive from a user a machine-readable code associated with a group. The group can be identified based on the machine-readable code. A set of current members of the group can be identified. The user can be provided with access to the set of current members of the group. In some instances, an identifier for the user can be received. The user can be added, based on the identifier, to the set of current members of the group. The current members can be provided with access to the set of current members including the user. It is contemplated that many variations are possible.

FIG. 1A illustrates an example system 100 in which group actions can be performed based on machine-readable codes, according to an embodiment of the present disclosure. As shown in the example of FIG. 1A, the system 100 can include at least one server system 102, a first client device 110, a second client device 120, and a third client device 130. The server system 102 can include a group machine-readable code module 104. The components shown in this figure and all figures herein are exemplary only, and other implementations may include additional, fewer, integrated, or different components. Some components may not be shown so as not to obscure relevant details.

The first client device 110 can correspond to a computing device (or system) associated with User A, who is a host user. The second client device 120 can correspond to a computing device associated with User B. The third client device 130 can correspond to a computing device associated with User C. In this example system 100, the host user (User A) can utilize his or her computing device to provide a machine-readable code, such as by presenting or displaying a Quick Response (QR) code 112.

In some instances, a host user can be a user who hosts, creates, moderates, or otherwise manages a group. The group can correspond to a collection, assembly, or community including one or more group members. In some cases, the group can exist virtually or be represented digitally, such as the case for a social networking group or an online forum group. In some cases, the group can correspond to a gathering of one or more users to facilitate accomplishing one or more objectives.

In the example of FIG. 1A, the host user (e.g., User A) can utilize his or her computing device (or system) 110 to create a group. The host user can acquire a machine-readable code, such as a QR code 112, that is associated with or representative of the group. In some embodiments, the QR code 112 can be generated by the host user's computing device 110, such as by an application running on the host user's computing device 110. In some embodiments, the host user can request the QR code 112 from the server system 102 (or the group machine-readable code module 104 on the server system 102). For example, User A can request the server system 112 to create the group and/or to create the QR code 112 representing the group. The host user's computing device 110 can acquire or receive, from the server system 102, the QR code 112 representative of the group.

Continuing with the example of FIG. 1A, the host user can provide, present, and/or display the QR code 112 via his or her computing device 110. User B can utilize a machine-readable code scanner, such as a QR code scanner, on his or her computing device 120 to read or scan the QR code 112. Upon scanning or reading the QR code 112, User B's computing device 120 can provide the QR code 112, or a representation thereof, to the server system 102 for processing. The server system 102 can utilize the group machine-readable code module 104 to determine that the QR code 112 provided by User B's device 120 is associated with or representative of the group created by User A, the host user. In this example, in response to User B scanning the QR code 112, the group machine-readable code module 104 can cause User B to be added as a member of the group. The group machine-readable code module 104 can provide and/or broadcast, to all members of the group, a list of current members of the group including the newly added User B. In some implementations, User B can perform one or more actions with respect to some or all of the current members of the group. Likewise, one or more other members of the group can perform one or more actions with respect to the newly added User B.

Furthermore, in this example, User C can also utilize a QR code scanner on his or her computing device 130 to read or scan the QR code 112 presented by User A's computing device 110. Upon scanning or reading the QR code 112 by User C's computing device 130, the group machine-readable code module 104 can cause User C to be added as a member of the group. The group machine-readable code module 104 can provide and/or broadcast, to all members of the group, an updated list of current members of the group including the newly added User C. In some implementations, User C can perform one or more actions with respect to some or all of the current members of the group. Similarly, other members of the group can perform actions with respect to the newly added User C.

Figure 1B:
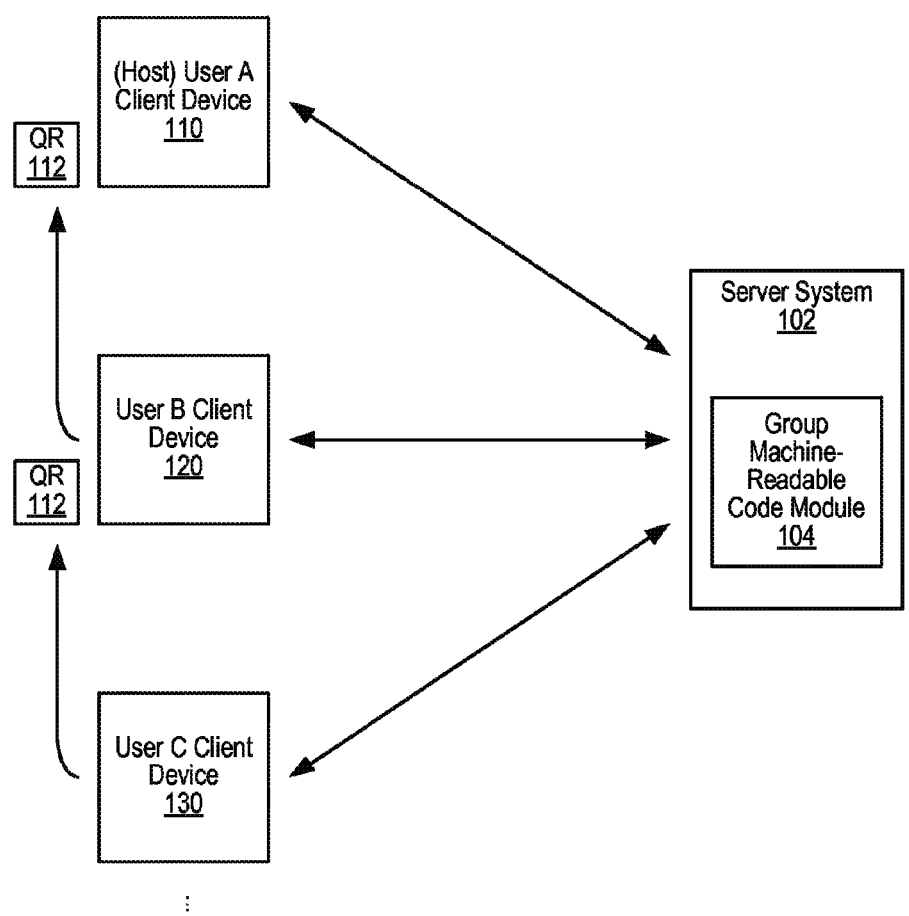
FIG. 1B illustrates an example system in which group actions can be performed based on machine-readable codes, according to an embodiment of the present disclosure.

FIG. 1B illustrates an example system 150 in which group actions can be performed based on machine-readable codes, according to an embodiment of the present disclosure. As shown in FIG. 1B, the example system 150 can include various elements of FIG. 1A, such as the at least one server system 102 with the group machine-readable code module 104, the first client device 110 (or computing device or system) of User A, the second client device 120 of User B, and the third client device 130 of User C.

In the example of FIG. 1B, the QR code 112 can represent or be associated with a group that is created and/or managed by User A, a host user of the group. In this example, the QR code 112 can initially be provided, presented, and/or displayed by the computing device 110 of User A, the host user. User B can utilize his or her computing device 120 to scan or read the QR code 112 provided by User A's device 110. The scanning or reading of the QR code 112 by User B's computing device 120 can cause the group machine-readable code module 104 on the server system 102 to add User B to the group.

In some embodiments, as shown in the example of FIG. 1B, the QR code 112 can be further provided, presented, and/or displayed by User B's computing device 120 subsequent to the scanning of the QR code 112 by User B. Continuing with this example, in some instances, User C can also utilize his or her computing device 130 to read or scan the QR code 112 provided, presented, and/or displayed by User B's computing device 120. Upon reading or scanning the QR code 112 by User C, the group machine-readable code module 104 on the server system 102 can add User C to the group. In some implementations, User C can further provide, present, and/or display the QR code 112 on his or her computing device 130 for one or more other users to scan and be added to the group.

Accordingly, User A, User B, User C, and other members of the group can interact with one another by scanning the QR code 112 and joining the group. Upon joining the group, User A, User B, User C, and other members can perform one or more actions with respect to one another. More details regarding the one or more actions will be provided below.

Figure 2:
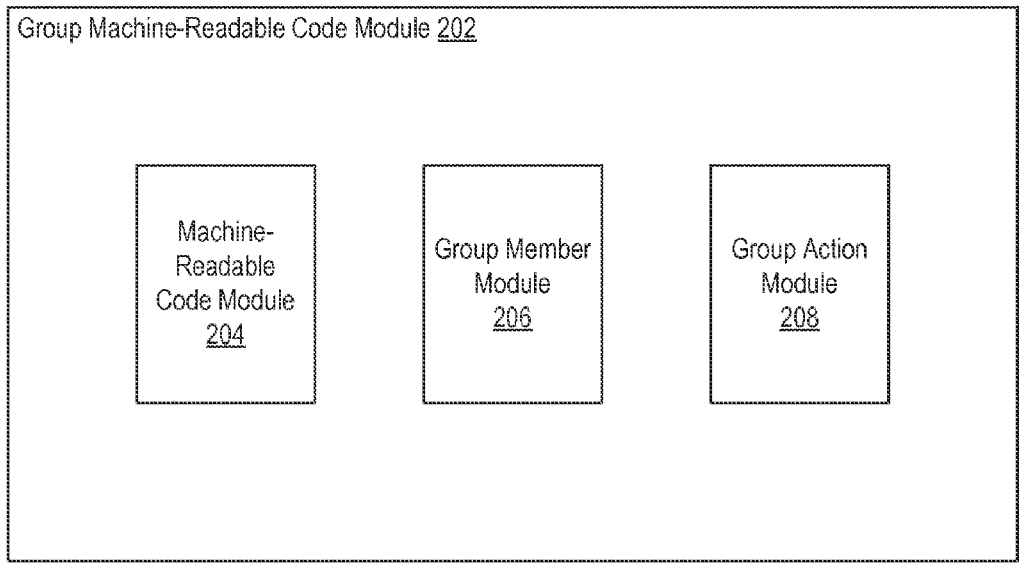
FIG. 2 illustrates an example group machine-readable code module configured to facilitate performing group actions based on machine-readable codes, according to an embodiment of the present disclosure.

FIG. 2 illustrates an example group machine-readable code module 202 configured to facilitate performing group actions based on machine-readable codes, according to an embodiment of the present disclosure. In some embodiments, the group machine-readable code module 104 of FIG. 1A and FIG. 1B can be implemented as the example group machine-readable code module 202. The group machine-readable code module 202 can be configured to enable users to join a group based on a machine-readable code associated with the group. Upon joining the group, one or more users or group members can perform one or more group actions with respect to some or all members of the group. As shown in the example of FIG. 2, the group machine-readable code module 202 can include a machine-readable code module 204, a group member module 206, and a group action module 208.

In some implementations, the machine-readable code module 204 can be configured to facilitate receiving from a user a machine-readable code associated with a group. For example, the user can scan or read the machine-readable code and transmit the machine-readable code for receipt at the machine-readable code module 204. The machine-readable code module 204 will be discussed in more detail with reference to FIG. 3.

The group member module 206 can be configured to facilitate identifying the group based on the machine-readable code. Moreover, the group member module 206 can be configured to facilitate identifying a set of current members of the group. In some instances, the group member module 206 can be further configured to facilitate providing the user with access to the set of current members of the group. More details relating to the group member module 206 will be provided with reference to FIG. 4.

The group action module 208 can be configured to facilitate providing the user with one or more actions to be performed with respect to at least a subset of the set of current members of the group. The group action module 208 will be discussed in more detail with reference to FIG. 5.

Additionally, in some embodiments, the group member module 206 can be configured to facilitate receiving an identifier for the user. The group member module 206 can add the user, based on the identifier, to the set of current members of the group. The group member module 206 can also provide the current members with access to the set of current members including the user.

Figure 3:
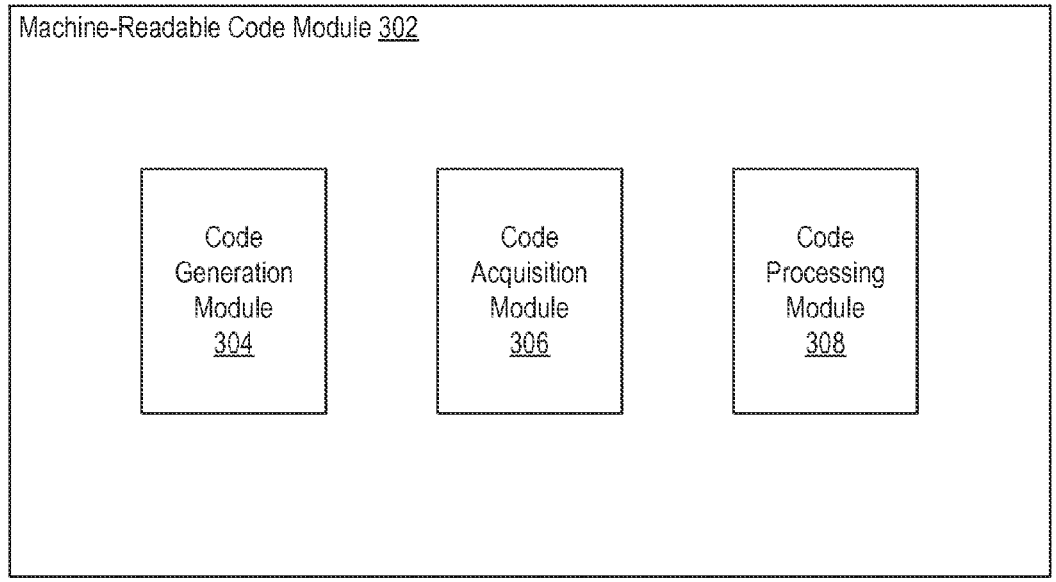
FIG. 3 illustrates an example machine-readable code module configured to facilitate performing group actions based on machine-readable codes, according to an embodiment of the present disclosure.

FIG. 3 illustrates an example machine-readable code module 302 configured to facilitate performing group actions based on machine-readable codes, according to an embodiment of the present disclosure. In some embodiments, the machine-readable code module 204 of FIG. 2 can be implemented as the example machine-readable code module 302. As shown, the example machine-readable code module 302 can include a code generation module 304, a code acquisition module 306, and a code processing module 308.

In some embodiments, a host user of a group can request a server system to generate a machine-readable code that represents, links to, or is otherwise associated with the group. In some implementations, the machine-readable code can include at least one of a Quick Response (QR) code, a machine-readable barcode, or a machine-readable tag, etc. Other variations can also be used. The code generation module 304 can be configured to facilitate generating or creating the machine-readable code that represents, links to, or is otherwise associated with the group of the host user. For example, the host user can provide an address or identifier for the group (e.g., a link to a social networking system profile page or timeline of the group). The code generating module 304 can generate or create the machine-readable code based on the address or identifier associated with the group. In some embodiments, the code generation module 304 can be optionally implemented.

In one example, the host user can provide the machine-readable code associated with the group to be scanned or read by another user. Upon scanning or reading the machine-readable code, a computing device or system of the other user can provide or transmit the machine-readable code to the machine-readable code module 302. The code acquisition module 306 of the machine-readable code module 302 can be configured to acquire or receive, from the other user (i.e., from his or her computing device), the machine-readable code associated with the group.

The code processing module 308 can be configured to handle or otherwise process the acquired or received machine-readable code. In some instances, the code processing module 308 can be configured to parse or otherwise analyze the machine-readable code to process the data incorporated within or represented by the machine-readable code. In some embodiments, the code processing module 308 can be implemented with, reside in, and/or work in conjunction with the group identification module 404 of FIG. 4, in order to facilitate identifying the group based on the machine-readable code. It should be understood that there can be many possibilities and variations.

Figure 4:
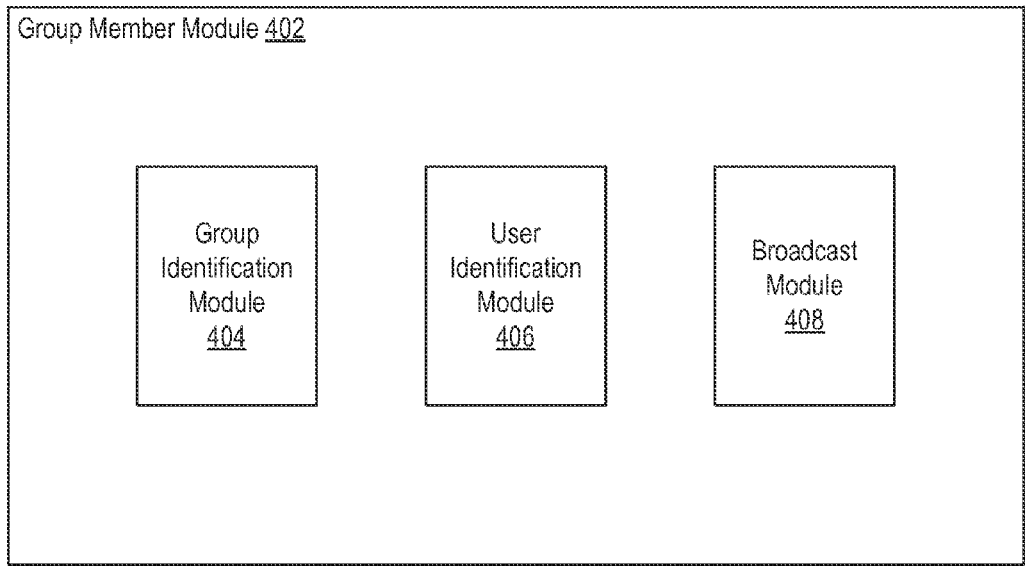
FIG. 4 illustrates an example group member module configured to facilitate performing group actions based on machine-readable codes, according to an embodiment of the present disclosure.

FIG. 4 illustrates an example group member module 402 configured to facilitate performing group actions based on machine-readable codes, according to an embodiment of the present disclosure. In some embodiments, the group member module 206 of FIG. 2 can be implemented as the example group member module 402. As shown, the group member module 402 can include a group identification module 404, a user identification module 406, and a broadcast module 408.

The group identification module 404 can be configured to facilitate identifying a group based on a machine-readable code. For example, the group identification module 404 can determine with which group the machine-readable code is associated or which group the machine-readable code represents. In some cases, the machine-readable code can incorporate a set of alphanumeric characters (e.g., a string) or other data that represents an identifier or address for the group. The group identification module 404 can determine an identification of the group based on the set of alphanumeric characters or other data.

In some embodiments, the group identification module 404 can be implemented with, reside in, and/or work in conjunction with the code processing module 308 of FIG. 3, in order to facilitate identifying the group based on the machine-readable code. Many variations are possible.

As discussed previously, in some cases, an identifier can be received for a user who scanned the machine-readable code. The user identification module 406 can be configured to facilitate receiving the identifier for the user and to facilitate identifying the user based on the identifier. The identifier for the user can include, for example, at least one of a unique identifier (UID), a universally unique identifier (UUID), a social networking identifier, an address, or a link, etc. Moreover, the user can be added, based on the identifier, to the set of current members of the group. When the current members are provided with access to the set of current members, the set of current members can include the user.

The broadcast module 408 can be configured to facilitate providing the current members with access to the set of current members. In some implementations, providing the current members with access to the set can correspond to one or more push operations. For example, in some cases, whenever a new user is added to the set of current members of the group, the broadcast module 408 can broadcast or provide, to the current members, a list of the current members including the new user. The broadcasting or providing of the list can be performed via one or more push operations. Also, it is contemplated that there can be other possibilities. In some implementations, one or more pull operations can be used to provide the list of the current members.

In some embodiments, subsequent to the providing or broadcasting of the set of current members to the user, the set of current members of the group can be presented to the user via a computing device of the user. In some cases, the presented set of current members can be sorted based on at least one of time (e.g., time of joining the group), an alphabetical order (e.g., alphabetical order by name), or a social network graph rank relative to the user (e.g., a social network relatedness metric relative to the user). Again, many variations are possible.

Figure 5:
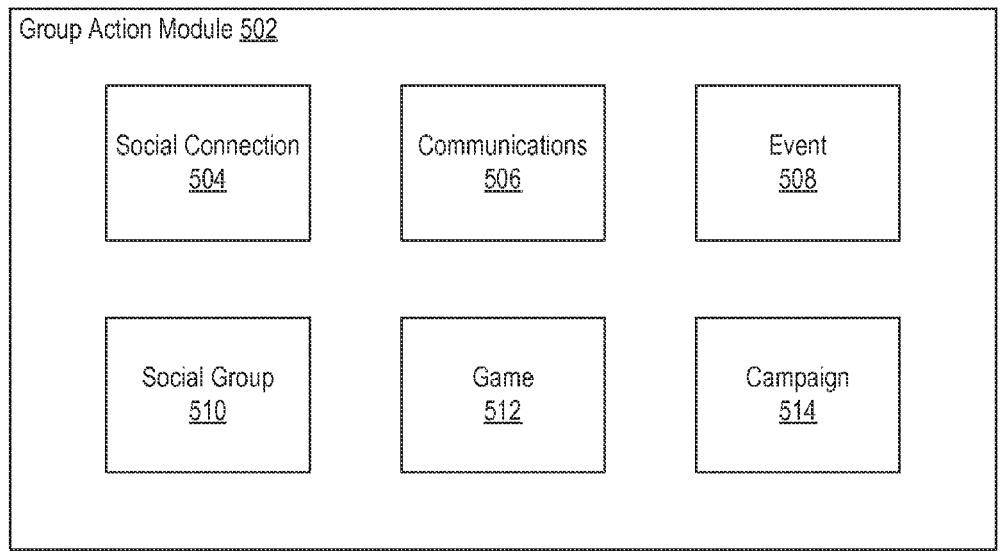
FIG. 5 illustrates an example group action module configured to facilitate performing group actions based on machine-readable codes, according to an embodiment of the present disclosure.

FIG. 5 illustrates an example group action module 502 configured to facilitate performing group actions based on machine-readable codes, according to an embodiment of the present disclosure. In some embodiments, the group action module 208 of FIG. 2 can be implemented as the example group action module 502. As shown in the example of FIG. 5, the group action module 502 can include, but is not limited to, a social connection component 504, a communications component 506, an event component 508, a social group component 510, a game component 512, and a campaign component 514.

As discussed above, subsequent to the user (who scanned the machine-readable code) being added to the group, the user can be provided with one or more actions to be performed with respect to at least a subset of the set of current members of the group. In some instances, the user can be provided with one or more actions to be performed with respect to an entirety of the set of current members excluding the user. Also, in some cases, the other current members of the group can be provided with one or more actions to be performed with respect to the newly added user. The group action module 502 can be configured to facilitate providing the user with one or more actions to be performed with respect to the at least the subset (or the entirety) of the set of current members of the group. The group action module 502 can be further configured to facilitate providing the other current members with one or more actions to be performed with respect to the newly added user.

In some implementations, the host user can set or specify which actions are available. In one example, the host user can specify that the group is for accessing one or more resources. Thus, the current members of the group can perform actions associated with accessing or sharing resources (e.g., data, files, etc.). In another example, the host user can specify that the group is for providing social connection functionality. Accordingly, the social connection component 504 can enable current members of the group to add one another as social network connections, request to add one another as social network connections, remove or cancel one another from being social network connections, and/or ignore requests for social networking connections, etc.

In another example, the group can be for communicating or messaging. As such, the communications component 506 can enable current members to communicate with one another via messages (e.g., group text chat), conversations (e.g., group voice chat), etc.

In a further example, the group can be associated with an event. The event component 508 can enable current members to interact with one another in relation to an event. Members can, for example, RSVP to the event, decline to attend the event, view a guest list for the event, and/or invite others to the event, etc.

In another example, the group can be associated with a social group, such as a group within a social networking system or an online forum. The social group component 510 can enable current members to interact with one another in the social group.

In a further example, the game component 512 can enable current members to interact with respect to a game. In another example, the campaign component 514 can enable current members to interact with respect to a campaign, such as a marketing campaign, a political campaign, etc. In another example, current members can interact with respect to a page, such as a social networking page or timeline. It should be appreciated that many variations are possible.

Figure 6A:
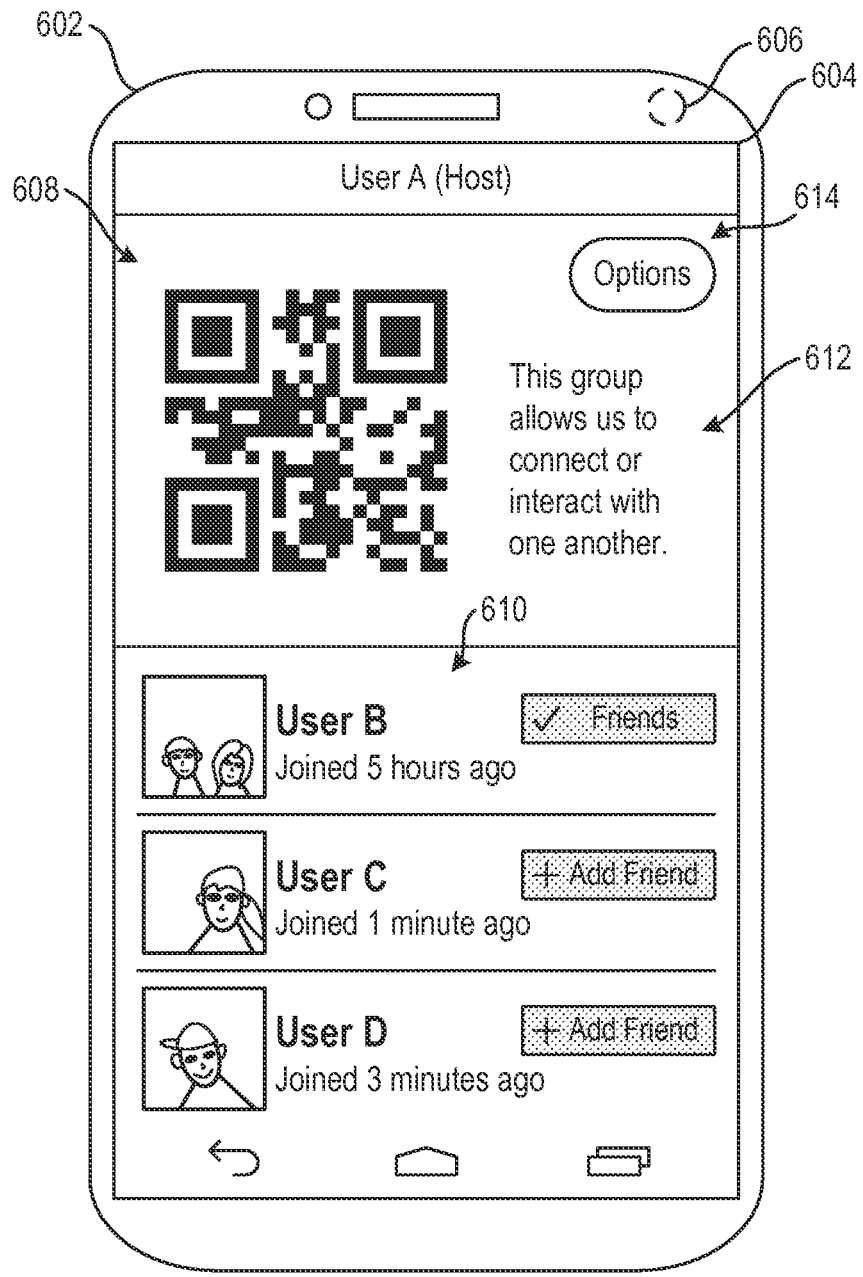
FIG. 6A illustrates an example computing system configured to facilitate performing group actions based on machine-readable codes, according to an embodiment of the present disclosure.

FIG. 6A illustrates an example computing system 602 configured to facilitate performing group actions based on machine-readable codes, according to an embodiment of the present disclosure. In the example of FIG. 6A, the computing system (or device) 602 can be associated with User A, a host user of a group. The example computing system 602 can include, but is not limited to, a display element (e.g., touch screen) 604 and a camera 606.

In the example of FIG. 6A, the computing system 602 can be running an application. The application can present or display a QR code 608 representing the group of the host user, User A. The QR code 608 can be presented on the display element 604 for other users to scan or read.

Furthermore, as a member of the group, User A can be provided with a set of current members of the group 610. In some cases, the QR code 608 and the set of current members 610 can be provided on the display element 604 at least temporarily in conjunction. In some implementations, a description 612 for the group can also be presented. The description 612 can provide information about the group.

User A can set, specify, and perform one or more group actions with respect to at least some of the current members. In this example, the current members of the group can add one another as social connections or friends. As shown in FIG. 6A, User A has already added User B as a friend, but has yet to add User C and User D as friends.

In some instances, it must first be determined that a user who scanned the QR code 608 satisfies one or more specified criteria before he or she is allowed to join the group and is provided with access to the set of current members of the group. The one or more specified criteria can be set or defined by at least one of a system setting or an instruction from the host user. In some embodiments, the host user can be provided with one or more options via an interface element 614. In one example, the one or more specified criteria can be set or defined by the host user via the one or more options accessible through the interface element 614. In some cases, the one or more specified criteria can be associated with at least one of a time limitation, a location or proximity limitation, a privacy limitation, or a limitation relating to a number of times the machine-readable code is scanned, etc. Many variations are possible.

Figure 6B:
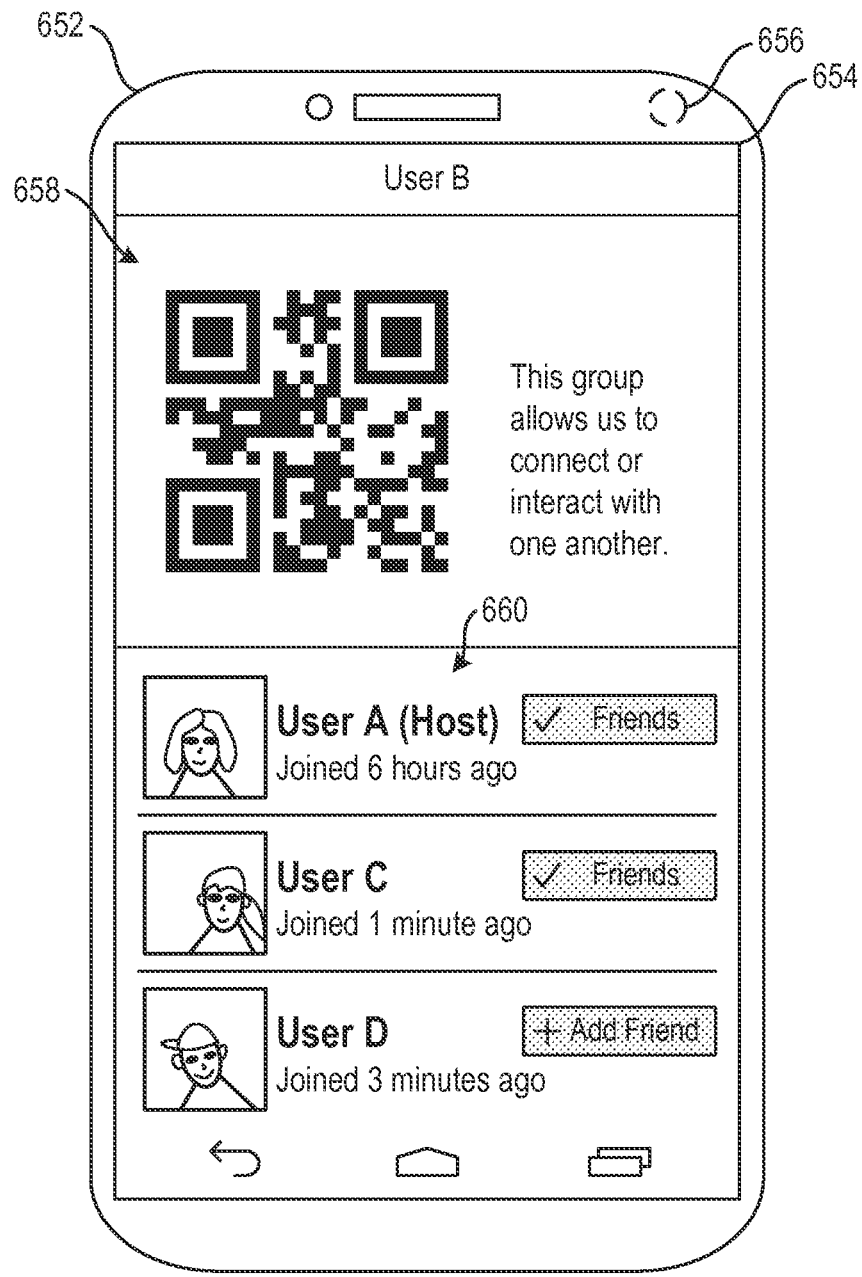
FIG. 6B illustrates an example computing system configured to facilitate performing group actions based on machine-readable codes, according to an embodiment of the present disclosure.

FIG. 6B illustrates an example computing system 652 configured to facilitate performing group actions based on machine-readable codes, according to an embodiment of the present disclosure. In the example of FIG. 6B, the computing system (or device) 652 can be associated with User B, a user who has joined the group of User A. The example computing system 652 can include, but is not limited to, a display element (e.g., a touch screen) 654 and a camera 656.

In the example of FIG. 6B, User B can be running an application (e.g., the same application as that of User A in FIG. 6A) on his or her computing system 652. The application can utilize the camera 656 of User B's computing system 652 to scan or read the QR code 608 presented on the display element 604 of User A's computing system 602. Subsequent to scanning or reading the QR code 608, User B can be added to the group. As one of the current members of the group, User B can be provided with access to the set of current members of the group 660. Also, in some embodiments, the application can present a QR code 658 for the group on User B's computing system 652. The QR code 658 can be the same as the QR code 608 of FIG. 6A.

Figure 7:
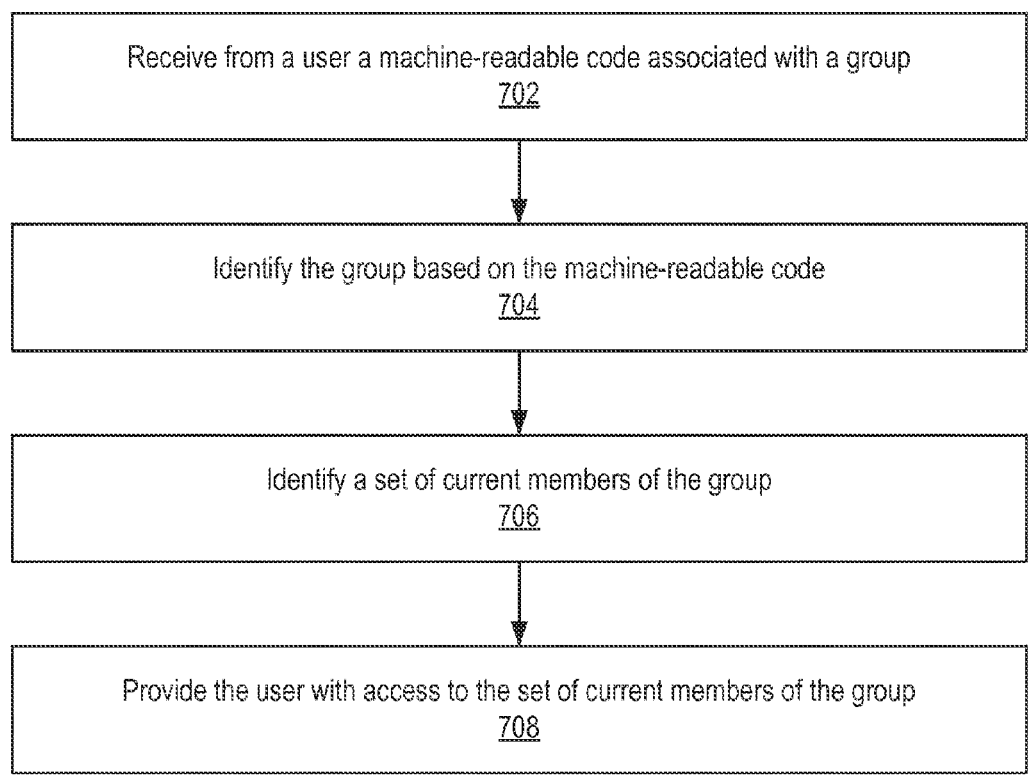
FIG. 7 illustrates an example method associated with performing group actions based on machine-readable codes, according to an embodiment of the present disclosure.

FIG. 7 illustrates an example method 700 associated with performing group actions based on machine-readable codes, according to an embodiment of the present disclosure. It should be appreciated that there can be additional, fewer, or alternative steps performed in similar or alternative orders, or in parallel, within the scope of the various embodiments unless otherwise stated.

At block 702, the example method 700 can receive from a user a machine-readable code associated with a group. For example, the user can scan or read the machine-readable code using a machine-readable code scanner tool. The user can then cause the machine-readable code, or data representing the machine readable code, to be transmitted for receipt.

At block 704, the example method 700 can identify the group based on the machine-readable code. For example, the machine-readable code can incorporate data that represents an identifier, a link, or an address for the group. The machine-readable code can be looked up via a table (e.g., a look-up table) or other data store in order to identify the group.

At block 706, the example method 700 can identify a set of current members of the group. For example, there can be a data store which stores and maintains a respective set of current members for each of a plurality of groups. The example method 700 can identify the desired group based on the machine-readable code and then identify the corresponding set of current members for that group.

At block 708, the example method 700 can provide the user with access to the set of current members of the group. For example, the example method 700 can transmit or deliver at least a subset of the set of current members of the group to the user (i.e., to the user's computing device). The set of current members, or the at least the subset thereof, can be presented or displayed to the user.

Figure 8:
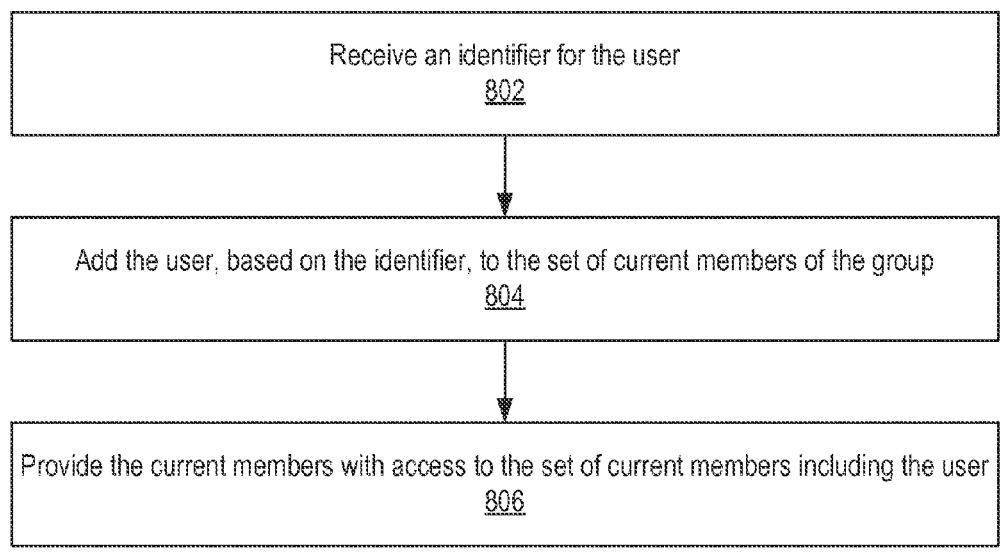
FIG. 8 illustrates an example method associated with performing group actions based on machine-readable codes, according to an embodiment of the present disclosure.

FIG. 8 illustrates an example method 800 associated with performing group actions based on machine-readable codes, according to an embodiment of the present disclosure. Again, it should be appreciated that there can be additional, fewer, or alternative steps performed in similar or alternative orders, or in parallel, within the scope of the various embodiments unless otherwise stated.

At block 802, the example method 800 can receive an identifier for the user. For example, the method 800 can receive a unique identifier (UID), a universally unique identifier (UUID), a social networking identifier, an address, or a link, etc., associated with the user.

At block 804, the example method 800 can add the user, based on the identifier, to the set of current members of the group. For example, the method 800 can add the identifier for the user to the set of current members of the group.

At block 806, the example method 800 can provide the current members with access to the set of current members including the user. In some cases, when the user is added to the set, the method 800 can push, to the current members, at least a subset of the set of current members including the user.

In some embodiments, the machine-readable code can be presented via a computing device of the user in conjunction, at least temporarily, with at least a subset of the set of current members of the group that is also presented via the computing device of the user.

In some embodiments, the machine-readable code presented via the computing device of the user can be scanned, using a code scanner tool, by at least a second user.

In some embodiments, a second identifier can be received for the second user. The second user can be added, based on the second identifier, to the set of current members of the group. The current members can be provided with access to the set of current members including the second user.

In some embodiments, the group can be associated with at least one of a social networking system, a forum, a meeting, or an event.

Again, it is contemplated that there can be many other uses, applications, and/or variations associated with the various embodiments of the present disclosure. For example, various embodiments of the present disclosure can learn, improve, and/or be refined over time.

Social Networking System—Example Implementation

Figure 9:
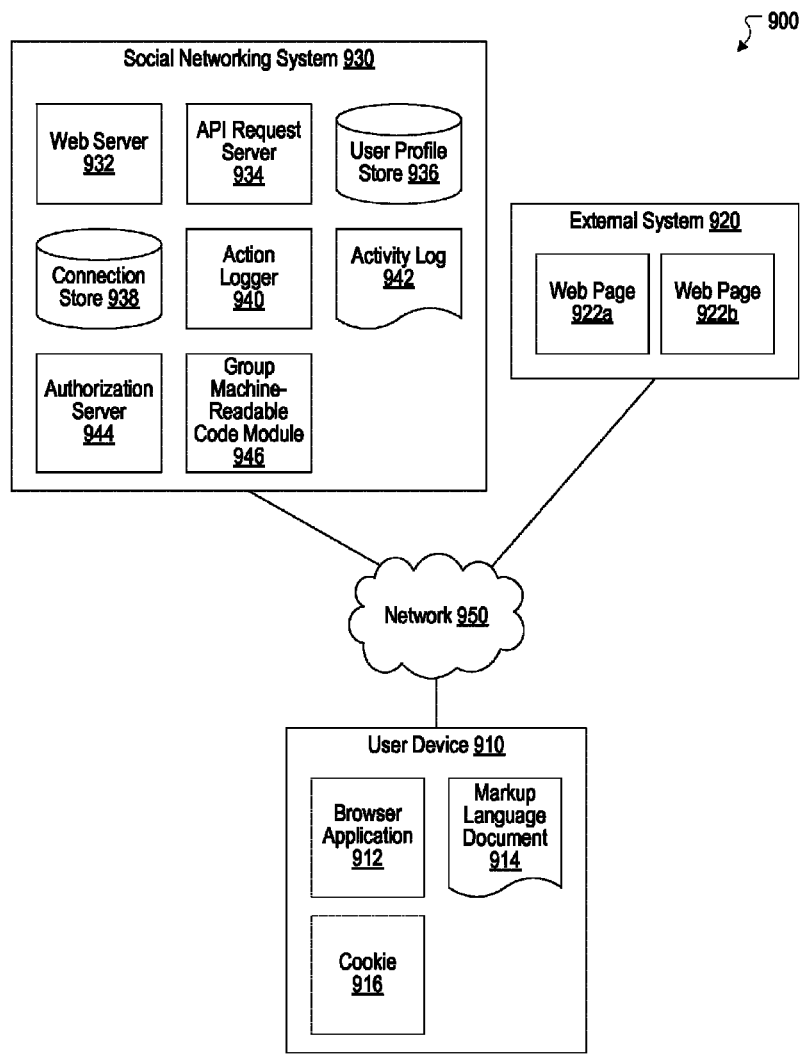
FIG. 9 illustrates a network diagram of an example system that can be utilized in various scenarios, according to an embodiment of the present disclosure.

FIG. 9 illustrates a network diagram of an example system 900 that can be utilized in various scenarios, in accordance with an embodiment of the present disclosure. The system 900 includes one or more user devices 910, one or more external systems 920, a social networking system (or service) 930, and a network 950. In an embodiment, the social networking service, provider, and/or system discussed in connection with the embodiments described above may be implemented as the social networking system 930. For purposes of illustration, the embodiment of the system 900, shown by FIG. 9, includes a single external system 920 and a single user device 910. However, in other embodiments, the system 900 may include more user devices 910 and/or more external systems 920. In certain embodiments, the social networking system 930 is operated by a social network provider, whereas the external systems 920 are separate from the social networking system 930 in that they may be operated by different entities. In various embodiments, however, the social networking system 930 and the external systems 920 operate in conjunction to provide social networking services to users (or members) of the social networking system 930. In this sense, the social networking system 930 provides a platform or backbone, which other systems, such as external systems 920, may use to provide social networking services and functionalities to users across the Internet.

The user device 910 comprises one or more computing devices that can receive input from a user and transmit and receive data via the network 950. In one embodiment, the user device 910 is a conventional computer system executing, for example, a Microsoft Windows compatible operating system (OS), Apple OS X, and/or a Linux distribution. In another embodiment, the user device 910 can be a device having computer functionality, such as a smart-phone, a tablet, a personal digital assistant (PDA), a mobile telephone, etc. The user device 910 is configured to communicate via the network 950. The user device 910 can execute an application, for example, a browser application that allows a user of the user device 910 to interact with the social networking system 930. In another embodiment, the user device 910 interacts with the social networking system 930 through an application programming interface (API) provided by the native operating system of the user device 910, such as iOS and ANDROID. The user device 910 is configured to communicate with the external system 920 and the social networking system 930 via the network 950, which may comprise any combination of local area and/or wide area networks, using wired and/or wireless communication systems.

In one embodiment, the network 950 uses standard communications technologies and protocols. Thus, the network 950 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 950 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 950 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 910 may display content from the external system 920 and/or from the social networking system 930 by processing a markup language document 914 received from the external system 920 and from the social networking system 930 using a browser application 912. The markup language document 914 identifies content and one or more instructions describing formatting or presentation of the content. By executing the instructions included in the markup language document 914, the browser application 912 displays the identified content using the format or presentation described by the markup language document 914. For example, the markup language document 914 includes instructions for generating and displaying a web page having multiple frames that include text and/or image data retrieved from the external system 920 and the social networking system 930. In various embodiments, the markup language document 914 comprises a data file including extensible markup language (XML) data, extensible hypertext markup language (XHTML) data, or other markup language data. Additionally, the markup language document 914 may include JavaScript Object Notation (JSON) data, JSON with padding (JSONP), and JavaScript data to facilitate data-interchange between the external system 920 and the user device 910. The browser application 912 on the user device 910 may use a JavaScript compiler to decode the markup language document 914.

The markup language document 914 may also include, or link to, applications or application frameworks such as FLASH™ or Unity™ applications, the SilverLight™ application framework, etc.

In one embodiment, the user device 910 also includes one or more cookies 916 including data indicating whether a user of the user device 910 is logged into the social networking system 930, which may enable modification of the data communicated from the social networking system 930 to the user device 910.

The external system 920 includes one or more web servers that include one or more web pages 922a, 922b, which are communicated to the user device 910 using the network 950. The external system 920 is separate from the social networking system 930. For example, the external system 920 is associated with a first domain, while the social networking system 930 is associated with a separate social networking domain. Web pages 922a, 922b, included in the external system 920, comprise markup language documents 914 identifying content and including instructions specifying formatting or presentation of the identified content.

The social networking system 930 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 930 may be administered, managed, or controlled by an operator. The operator of the social networking system 930 may be a human being, an automated application, or a series of applications for managing content, regulating policies, and collecting usage metrics within the social networking system 930. Any type of operator may be used.

Users may join the social networking system 930 and then add connections to any number of other users of the social networking system 930 to whom they desire to be connected. As used herein, the term "friend" refers to any other user of the social networking system 930 to whom a user has formed a connection, association, or relationship via the social networking system 930. For example, in an embodiment, if users in the social networking system 930 are represented as nodes in the social graph, the term "friend" can refer to an edge formed between and directly connecting two user nodes.

Connections may be added explicitly by a user or may be automatically created by the social networking system 930 based on common characteristics of the users (e.g., users who are alumni of the same educational institution). For example, a first user specifically selects a particular other user to be a friend. Connections in the social networking system 930 are usually in both directions, but need not be, so the terms "user" and "friend" depend on the frame of reference. Connections between users of the social networking system 930 are usually bilateral ("two-way"), or "mutual," but connections may also be unilateral, or "one-way." For example, if Bob and Joe are both users of the social networking system 930 and connected to each other, Bob and Joe are each other's connections. If, on the other hand, Bob wishes to connect to Joe to view data communicated to the social networking system 930 by Joe, but Joe does not wish to form a mutual connection, a unilateral connection may be established. The connection between users may be a direct connection; however, some embodiments of the social networking system 930 allow the connection to be indirect via one or more levels of connections or degrees of separation.

In addition to establishing and maintaining connections between users and allowing interactions between users, the social networking system 930 provides users with the ability to take actions on various types of items supported by the social networking system 930. These items may include groups or networks (i.e., social networks of people, entities, and concepts) to which users of the social networking system 930 may belong, events or calendar entries in which a user might be interested, computer-based applications that a user may use via the social networking system 930, transactions that allow users to buy or sell items via services provided by or through the social networking system 930, and interactions with advertisements that a user may perform on or off the social networking system 930. These are just a few examples of the items upon which a user may act on the social networking system 930, and many others are possible. A user may interact with anything that is capable of being represented in the social networking system 930 or in the external system 920, separate from the social networking system 930, or coupled to the social networking system 930 via the network 950.

The social networking system 930 is also capable of linking a variety of entities. For example, the social networking system 930 enables users to interact with each other as well as external systems 920 or other entities through an API, a web service, or other communication channels. The social networking system 930 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 930. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 930 modifies edges connecting the various nodes to reflect the relationships and interactions.

The social networking system 930 also includes user-generated content, which enhances a user's interactions with the social networking system 930. User-generated content may include anything a user can add, upload, send, or "post" to the social networking system 930. For example, a user communicates posts to the social networking system 930 from a user device 910. Posts may include data such as status updates or other textual data, location information, images such as photos, videos, links, music or other similar data and/or media. Content may also be added to the social networking system 930 by a third party. Content "items" are represented as objects in the social networking system 930. In this way, users of the social networking system 930 are encouraged to communicate with each other by posting text and content items of various types of media through various communication channels. Such communication increases the interaction of users with each other and increases the frequency with which users interact with the social networking system 930.

The social networking system 930 includes a web server 932, an API request server 934, a user profile store 936, a connection store 938, an action logger 940, an activity log 942, and an authorization server 944. In an embodiment of the invention, the social networking system 930 may include additional, fewer, or different components for various applications. Other components, such as network interfaces, security mechanisms, load balancers, failover servers, management and network operations consoles, and the like are not shown so as to not obscure the details of the system.

The user profile store 936 maintains information about user accounts, including biographic, demographic, and other types of descriptive information, such as work experience, educational history, hobbies or preferences, location, and the like that has been declared by users or inferred by the social networking system 930. This information is stored in the user profile store 936 such that each user is uniquely identified. The social networking system 930 also stores data describing one or more connections between different users in the connection store 938. The connection information may indicate users who have similar or common work experience, group memberships, hobbies, or educational history. Additionally, the social networking system 930 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 930, such as non-person entities, buckets, cluster centers, images, interests, pages, external systems, concepts, and the like are also stored in the connection store 938.

The social networking system 930 maintains data about objects with which a user may interact. To maintain this data, the user profile store 936 and the connection store 938 store instances of the corresponding type of objects maintained by the social networking system 930. Each object type has information fields that are suitable for storing information appropriate to the type of object. For example, the user profile store 936 contains data structures with fields suitable for describing a user's account and information related to a user's account. When a new object of a particular type is created, the social networking system 930 initializes a new data structure of the corresponding type, assigns a unique object identifier to it, and begins to add data to the object as needed. This might occur, for example, when a user becomes a user of the social networking system 930, the social networking system 930 generates a new instance of a user profile in the user profile store 936, assigns a unique identifier to the user account, and begins to populate the fields of the user account with information provided by the user.

The connection store 938 includes data structures suitable for describing a user's connections to other users, connections to external systems 920 or connections to other entities. The connection store 938 may also associate a connection type with a user's connections, which may be used in conjunction with the user's privacy setting to regulate access to information about the user. In an embodiment of the invention, the user profile store 936 and the connection store 938 may be implemented as a federated database.

Data stored in the connection store 938, the user profile store 936, and the activity log 942 enables the social networking system 930 to generate the social graph that uses nodes to identify various objects and edges connecting nodes to identify relationships between different objects. For example, if a first user establishes a connection with a second user in the social networking system 930, user accounts of the first user and the second user from the user profile store 936 may act as nodes in the social graph. The connection between the first user and the second user stored by the connection store 938 is an edge between the nodes associated with the first user and the second user. Continuing this example, the second user may then send the first user a message within the social networking system 930. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 930 (or, alternatively, in an image maintained by another system outside of the social networking system 930). The image may itself be represented as a node in the social networking system 930. This tagging action may create edges between the first user and the second user as well as create an edge between each of the users and the image, which is also a node in the social graph. In yet another example, if a user confirms attending an event, the user and the event are nodes obtained from the user profile store 936, where the attendance of the event is an edge between the nodes that may be retrieved from the activity log 942. By generating and maintaining the social graph, the social networking system 930 includes data describing many different types of objects and the interactions and connections among those objects, providing a rich source of socially relevant information.

The web server 932 links the social networking system 930 to one or more user devices 910 and/or one or more external systems 920 via the network 950. The web server 932 serves web pages, as well as other web-related content, such as Java, JavaScript, Flash, XML, and so forth. The web server 932 may include a mail server or other messaging functionality for receiving and routing messages between the social networking system 930 and one or more user devices 910. The messages can be instant messages, queued messages (e.g., email), text and SMS messages, or any other suitable messaging format.

The API request server 934 allows one or more external systems 920 and user devices 910 to call access information from the social networking system 930 by calling one or more API functions. The API request server 934 may also allow external systems 920 to send information to the social networking system 930 by calling APIs. The external system 920, in one embodiment, sends an API request to the social networking system 930 via the network 950, and the API request server 934 receives the API request. The API request server 934 processes the request by calling an API associated with the API request to generate an appropriate response, which the API request server 934 communicates to the external system 920 via the network 950. For example, responsive to an API request, the API request server 934 collects data associated with a user, such as the user's connections that have logged into the external system 920, and communicates the collected data to the external system 920. In another embodiment, the user device 910 communicates with the social networking system 930 via APIs in the same manner as external systems 920.

The action logger 940 is capable of receiving communications from the web server 932 about user actions on and/or off the social networking system 930. The action logger 940 populates the activity log 942 with information about user actions, enabling the social networking system 930 to discover various actions taken by its users within the social networking system 930 and outside of the social networking system 930. Any action that a particular user takes with respect to another node on the social networking system 930 may be associated with each user's account, through information maintained in the activity log 942 or in a similar database or other data repository. Examples of actions taken by a user within the social networking system 930 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 930, the action is recorded in the activity log 942. In one embodiment, the social networking system 930 maintains the activity log 942 as a database of entries. When an action is taken within the social networking system 930, an entry for the action is added to the activity log 942. The activity log 942 may be referred to as an action log.

Additionally, user actions may be associated with concepts and actions that occur within an entity outside of the social networking system 930, such as an external system 920 that is separate from the social networking system 930. For example, the action logger 940 may receive data describing a user's interaction with an external system 920 from the web server 932. In this example, the external system 920 reports a user's interaction according to structured actions and objects in the social graph.

Other examples of actions where a user interacts with an external system 920 include a user expressing an interest in an external system 920 or another entity, a user posting a comment to the social networking system 930 that discusses an external system 920 or a web page 922*a* within the external system 920, a user posting to the social networking system 930 a Uniform Resource Locator (URL) or other identifier associated with an external system 920, a user attending an event associated with an external system 920, or any other action by a user that is related to an external system 920. Thus, the activity log 942 may include actions describing interactions between a user of the social networking system 930 and an external system 920 that is separate from the social networking system 930.

The authorization server 944 enforces one or more privacy settings of the users of the social networking system 930. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 920, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 920. One embodiment allows the specification of the set of entities to comprise an enumeration of entities. For example, the user may provide a list of external systems 920 that are allowed to access certain information. Another embodiment allows the specification to comprise a set of entities along with exceptions that are not allowed to access the information. For example, a user may allow all external systems 920 to access the user's work information, but specify a list of external systems 920 that are not allowed to access the work information. Certain embodiments call the list of exceptions that are not allowed to access certain information a "block list". External systems 920 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 944 contains logic to determine if certain information associated with a user can be accessed by a user's friends, external systems 920, and/or other applications and entities. The external system 920 may need authorization from the authorization server 944 to access the user's more private and sensitive information, such as the user's work phone number. Based on the user's privacy settings, the authorization server 944 determines if another user, the external system 920, an application, or another entity is allowed to access information associated with the user, including information about actions taken by the user.

In some embodiments, the social networking system 930 can include a group machine-readable code module 946. The group machine-readable code module 946 can, for example, be implemented as the group machine-readable code module 104 of FIG. 1A and FIG. 1B, and/or as the group machine-readable code module 202 of FIG. 2. The group machine-readable code module 946 can be configured to receive from a user a machine-readable code associated with a group. The group machine-readable code module 946 can also be configured to identify the group based on the machine-readable code. Further, the group machine-readable code module 946 can be configured to identify a set of current members of the group. Moreover, the group machine-readable code module 946 can be configured to provide the user with access to the set of current members of the group. Other features of the group machine-readable code module 946 are discussed herein in connection with the group machine-readable code module 104 and/or the group machine-readable code module 202.

Hardware Implementation

Figure 10:
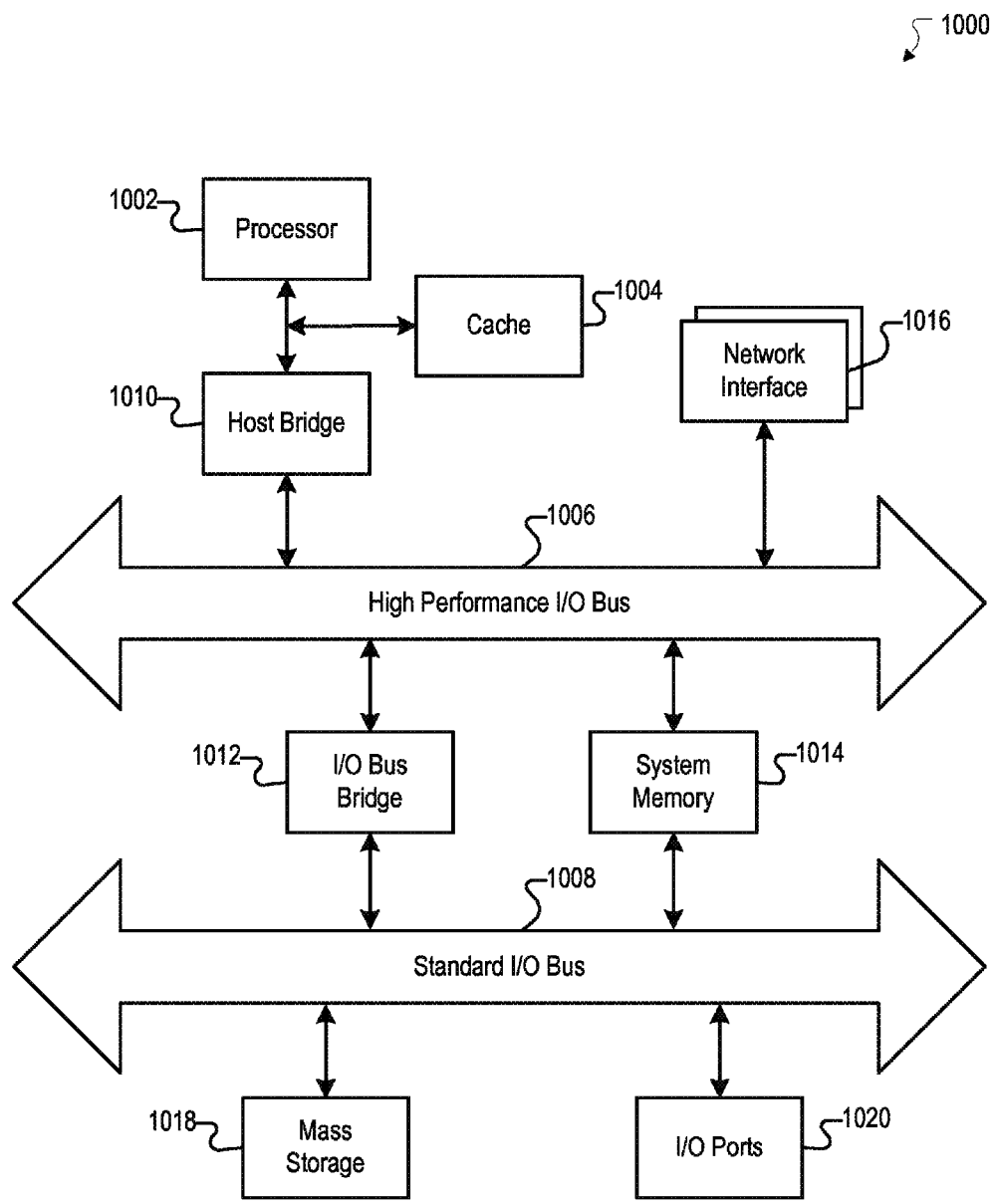
FIG. 10 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 10 illustrates an example of a computer system 1000 that may be used to implement one or more of the embodiments described herein in accordance with an embodiment of the invention. The computer system 1000 includes sets of instructions for causing the computer system 1000 to perform the processes and features discussed herein. The computer system 1000 may be connected (e.g., networked) to other machines. In a networked deployment, the computer system 1000 may operate in the capacity of a server machine or a client machine in a client-server network environment, or as a peer machine in a peer-to-peer (or distributed) network environment. In an embodiment of the invention, the computer system 1000 may be the social networking system 930, the user device 910, and the external system 1020, or a component thereof. In an embodiment of the invention, the computer system 1000 may be one server among many that constitutes all or part of the social networking system 930.

The computer system 1000 includes a processor 1002, a cache 1004, and one or more executable modules and drivers, stored on a computer-readable medium, directed to the processes and features described herein. Additionally, the computer system 1000 includes a high performance input/output (I/O) bus 1006 and a standard I/O bus 1008. A host bridge 1010 couples processor 1002 to high performance I/O bus 1006, whereas I/O bus bridge 1012 couples the two buses 1006 and 1008 to each other. A system memory 1014 and one or more network interfaces 1016 couple to high performance I/O bus 1006. The computer system 1000 may further include video memory and a display device coupled to the video memory (not shown). Mass storage 1018 and I/O ports 1020 couple to the standard I/O bus 1008. The computer system 1000 may optionally include a keyboard and pointing device, a display device, or other input/output devices (not shown) coupled to the standard I/O bus 1008. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1000 are described in greater detail below. In particular, the network interface 1016 provides communication between the computer system 1000 and any of a wide range of networks, such as an Ethernet (e.g., IEEE 802.3) network, a backplane, etc. The mass storage 1018 provides permanent storage for the data and programming instructions to perform the above-described processes and features implemented by the respective computing systems identified above, whereas the system memory 1014 (e.g., DRAM) provides temporary storage for the data and programming instructions when executed by the processor 1002. The I/O ports 1020 may be one or more serial and/or parallel communication ports that provide communication between additional peripheral devices, which may be coupled to the computer system 1000.

The computer system 1000 may include a variety of system architectures, and various components of the computer system 1000 may be rearranged. For example, the cache 1004 may be on-chip with processor 1002. Alternatively, the cache 1004 and the processor 1002 may be packed together as a "processor module", with processor 1002 being referred to as the "processor core". Furthermore, certain embodiments of the invention may neither require nor include all of the above components. For example, peripheral devices coupled to the standard I/O bus 1008 may couple to the high performance I/O bus 1006. In addition, in some embodiments, only a single bus may exist, with the components of the computer system 1000 being coupled to the single bus. Moreover, the computer system 1000 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1000 that, when read and executed by one or more processors, cause the computer system 1000 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1000, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1002. Initially, the series of instructions may be stored on a storage device, such as the mass storage 1018. However, the series of instructions can be stored on any suitable computer readable storage medium. Furthermore, the series of instructions need not be stored locally, and could be received from a remote storage device, such as a server on a network, via the network interface 1016. The instructions are copied from the storage device, such as the mass storage 1018, into the system memory 1014 and then accessed and executed by the processor 1002. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1000 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    obtaining, by a computing system, data describing a machine-readable code that references a group, the data being provided by a computing device of a user;
    identifying, by the computing system, the group based at least in part on the machine-readable code;
    determining, by the computing system, that the user satisfies one or more criteria that needs to be satisfied before the user is permitted to become a member of the group; and
    associating, by the computing system, the user with the group, wherein, upon becoming a member of the group, the user is permitted to perform one or more actions with respect to other members of the group.

2. The computer-implemented method of claim 1, wherein determining that the user satisfies the one or more criteria further comprises:
    determining, by the computing system, that a time at which the machine-readable code was provided by the computing device is within a time limitation associated with the group.

3. The computer-implemented method of claim 1, wherein determining that the user satisfies the one or more criteria further comprises:
    determining, by the computing system, that a location of the computing device at which the machine-readable code was provided satisfies a location or proximity limitation associated with the group.

4. The computer-implemented method of claim 1, wherein determining that the user satisfies the one or more criteria further comprises:
    determining, by the computing system, a count of a number of times the machine-readable code has been provided to the computing system by computing devices; and
    determining, by the computing system, that the count satisfies a limitation associated with the group, the limitation indicating a number of times the machine-readable code may be provided to the computing system.

5. The computer-implemented method of claim 1, wherein determining that the user satisfies the one or more criteria further comprises:
    determining, by the computing system, that a privacy setting of the user satisfies a privacy limitation associated with the group.

6. The computer-implemented method of claim 1, wherein the one or more criteria is defined as a system setting.

7. The computer-implemented method of claim 1, wherein the one or more criteria is defined by a host member of the group.

8. The computer-implemented method of claim 1, wherein upon becoming a member of the group, the user is permitted to access information describing the other members of the group.

9. The computer-implemented method of claim 1, wherein the machine-readable code includes at least one of a Quick Response (QR) code, a machine-readable barcode, or a machine-readable tag.

10. The computer-implemented method of claim 1, wherein the one or more actions include at least one of: requesting to add at least one of the other members as a social network connection, adding at least one of the other members as a social network connection, or communicating with at least one of the other member in one or more messages.

11. A system comprising:
    at least one processor; and
    a memory storing instructions that, when executed by the at least one processor, cause the system to perform:
        obtaining data describing a machine-readable code that references a group, the data being provided by a computing device of a user;
        identifying the group based at least in part on the machine-readable code;
        determining that the user satisfies one or more criteria that needs to be satisfied before the user is permitted to become a member of the group; and
        associating the user with the group, wherein, upon becoming a member of the group, the user is permitted to perform one or more actions with respect to other members of the group.

12. The system of claim 11, wherein determining that the user satisfies the one or more criteria further causes the system to perform:
    determining that a time at which the machine-readable code was provided by the computing device is within a time limitation associated with the group.

13. The system of claim 11, wherein determining that the user satisfies the one or more criteria further causes the system to perform:
    determining that a location of the computing device at which the machine-readable code was provided satisfies a location or proximity limitation associated with the group.

14. The system of claim 11, wherein determining that the user satisfies the one or more criteria further causes the system to perform:
    determining a count of a number of times the machine-readable code has been provided to the computing system by computing devices; and determining that the count satisfies a limitation associated with the group, the limitation indicating a number of times the machine-readable code may be provided to the computing system.

15. The system of claim 11, wherein determining that the user satisfies the one or more criteria further causes the system to perform:

determining that a privacy setting of the user satisfies a privacy limitation associated with the group.

16. A non-transitory computer-readable storage medium including instructions that, when executed by at least one processor of a computing system, cause the computing system to perform a method comprising:

obtaining data describing a machine-readable code that references a group, the data being provided by a computing device of a user;

identifying the group based at least in part on the machine-readable code;

determining that the user satisfies one or more criteria that needs to be satisfied before the user is permitted to become a member of the group; and associating the user with the group, wherein, upon becoming a member of the group, the user is permitted to perform one or more actions with respect to other members of the group.

17. The non-transitory computer-readable storage medium of claim 16, wherein determining that the user satisfies the one or more criteria further causes the system to perform:

determining that a time at which the machine-readable code was provided by the computing device is within a time limitation associated with the group.

18. The non-transitory computer-readable storage medium of claim 16, wherein determining that the user satisfies the one or more criteria further causes the system to perform:

determining that a location of the computing device at which the machine-readable code was provided satisfies a location or proximity limitation associated with the group.

19. The non-transitory computer-readable storage medium of claim 16, wherein determining that the user satisfies the one or more criteria further causes the system to perform:

determining a count of a number of times the machine-readable code has been provided to the computing system by computing devices; and determining that the count satisfies a limitation associated with the group, the limitation indicating a number of times the machine-readable code may be provided to the computing system.

20. The non-transitory computer-readable storage medium of claim 16, wherein determining that the user satisfies the one or more criteria further causes the system to perform:

determining that a privacy setting of the user satisfies a privacy limitation associated with the group.

\* \* \* \* \*